United States Patent [19]
VanderMeer et al.

[11] Patent Number: 5,646,946
[45] Date of Patent: Jul. 8, 1997

[54] APPARATUS AND METHOD FOR SELECTIVELY COMPANDING DATA ON A SLOT-BY-SLOT BASIS

[75] Inventors: John E. VanderMeer, Austin, Tex.; Duncan M. Fisher, Mission Viejo, Calif.; Tan Nhat Dao, Austin, Tex.

[73] Assignee: Motorola, Inc., Schaumburg, Ill.

[21] Appl. No.: 550,036

[22] Filed: Oct. 30, 1995

[51] Int. Cl.$^6$ ............................................. H04J 3/02
[52] U.S. Cl. ............................................ 370/442; 370/477
[58] Field of Search ........................... 370/84, 112, 118, 370/95.1, 109, 95.3, 79, 82, 83, 465, 468, 472, 535, 537, 538, 321, 337, 336, 420, 422, 442, 477; 341/51, 77, 75, 150, 95, 60, 61; 375/240, 241, 243, 249; 395/2.39, 2.26, 2.28; 381/30; 348/405, 406, 404

[56] References Cited

U.S. PATENT DOCUMENTS

| | | | |
|---|---|---|---|
| 4,358,845 | 11/1982 | De Passoz | 370/118 |
| 4,486,876 | 12/1984 | Gaunt, Jr. et al. | 375/249 |
| 4,581,737 | 4/1986 | Sparkell | 370/118 |
| 4,610,018 | 9/1986 | Rabaey et al. | 375/241 |
| 5,297,147 | 3/1994 | Shimokasa | 370/118 |
| 5,526,397 | 6/1996 | Lohman | 370/118 |

*Primary Examiner*—Douglas W. Olms
*Assistant Examiner*—Chau T. Nguyen
*Attorney, Agent, or Firm*—Daniel D. Hill

[57] ABSTRACT

A data processing system (10) and associated method (150) of operation selectively compand data on a slot-by-slot basis. The data processing system (10) includes a processor (12), processor bus (14), memory (16), output serial interface (18), and input serial interface (70). The output serial interface (18) includes an output data buffer (20), compression module (22), output shift register (24), and output controller (26). In operation, the output serial interface (18) receives output data (28) and selectively compresses the data on a slot-by-slot basis. The shift register (24) then places the transmit data (32) on the serial link (25). An input serial interface (128) selectively expands data received on the serial link (25) on a slot-by-slot basis to produce input data (82). The associated method (150) includes method steps for companding data on a slot-by-slot basis. An ISDN interface and digital telephone (200) employ the teachings of the present invention.

31 Claims, 8 Drawing Sheets

APPARATUS AND METHOD FOR SELECTIVELY COMPANDING DATA ON A SLOT-BY-SLOT BASIS

TECHNICAL FIELD OF THE INVENTION

This invention relates generally to signal transmission and receipt and more particularly to an apparatus and method for selectively companding data.

BACKGROUND OF THE INVENTION

The selective transmission and receipt of data over a serial interface has been known in the art for years. Applications in particular that use serial transmission links include telephone systems, audio visual systems, satellite communication systems, and various other applications that transmit data over distances. As is known in the art, a block of data may be transmitted serially as a bit stream, the block selectively transmitted from a sending location such that a receiving location may receive the data in a comprehensible format, recognize a portion of the bit stream as a block of data, and operate on the data accordingly.

One popular method of organizing serial transmissions of data in a time division, multiple access network, is to segregate a frame of data into a number of slots of data, with each slot of data corresponding to a particular communication. In a digital telephone system, for example, a serial link includes a frame synchronization line, a transmit data line, a receive data line, and a clocking signal. A frame synchronization signal on the frame synchronization line synchronizes with a first slot of data within a frame of data to allow the receiving location to determine when the frame begins. The clocking signal synchronizes with each bit of data within the frame to facilitate the latching of data.

Higher level signals, separately transmitted and received, describe how the frame of data is segregated and how the receiving location should operate on the frame of data. Based upon the frame synchronization, the clocking signal, and higher order instructions relating to slot widths and bit contents of the slot widths, the serial stream of data may be received and manipulated to produce input data for use in the particular application.

In the case of a digital telephone system, one particular conversation between a first location and a second location may occupy slot one within a frame of data. In each frame arriving at the first location and leaving the first location, slot one contains voice data that is used to reproduce a phone conversation between the first location and second location. Other conversations may utilize the particular frame of data as well, so long as the data does not occupy slot one. As data passes intermediary locations data may be removed from the data frame and additional data may be added to the data frame. Further, the data from the first location to the second location may be assigned a different slot location before it reaches the second location. However, when the data reaches the second location, receiving equipment at the second location knows in which slot the data resides, receives the data, and operates on the data accordingly.

In order to increase the data transmission capabilities of a digital link, data is often compressed, placed into a slot within a frame, transmitted from the sending location, and received at a remote location. At the remote location, the compressed data in the slot is uncompressed, or expanded, and then further used for the particular application. A compression/expansion system is often referred to as a companding operation. By using a companding operation, the effective band width of a particular digital serial link increases because of the associated increase in data transmission capacity. Various companding algorithms may be used to compand data such as Mu-law and A-law. When companding is used, the transmitting and receiving equipment must both operate in accordance with the particular companding law to function properly.

Prior art companding hardware provided for companding type and enablement selection only during start-up or reset. Thus, the prior art hardware could not facilitate a change in the companding during continued operation. Thus, those prior art devices that were required to selectively compand enabled the companding in software. The software processing requirements of selective companding were great, however, and significant processing time was required simply to perform the companding of data. The processing time not only increased system requirements but delayed other operations.

Thus, there exists a need in the art for an improved apparatus and method for the companding of data.

DETAILED DESCRIPTION OF THE DRAWINGS

The present invention relates to a data processing system and associated method of operation for selectively companding data on a slot-by-slot basis. The apparatus of the data processing system includes a processor, processor bus, memory, output serial interface, and input serial interface. The output serial interface includes an output data buffer, compression module, output shift register, and output controller. In operation the output serial interface receives output data on the processor bus and selectively compresses the data on a slot-by-slot basis. Each portion of the output data corresponds to a block or slot of data within a frame of data. The controller provides the control signals that cause the output serial interface to selectively compress the output data to produce the transmit data on a slot-by-slot basis. The shift register then places the transmit data on the serial link. The data processing system also includes an input serial interface that selectively expands data received on the serial link on a slot-by-slot basis to produce input data. Thus, the data processing system and associated method provide the important advantage of performing a slot-by-slot companding of data in hardware, therefore reducing the processing requirements within the software portion of the system and increasing the speed of operation.

Figure 1:
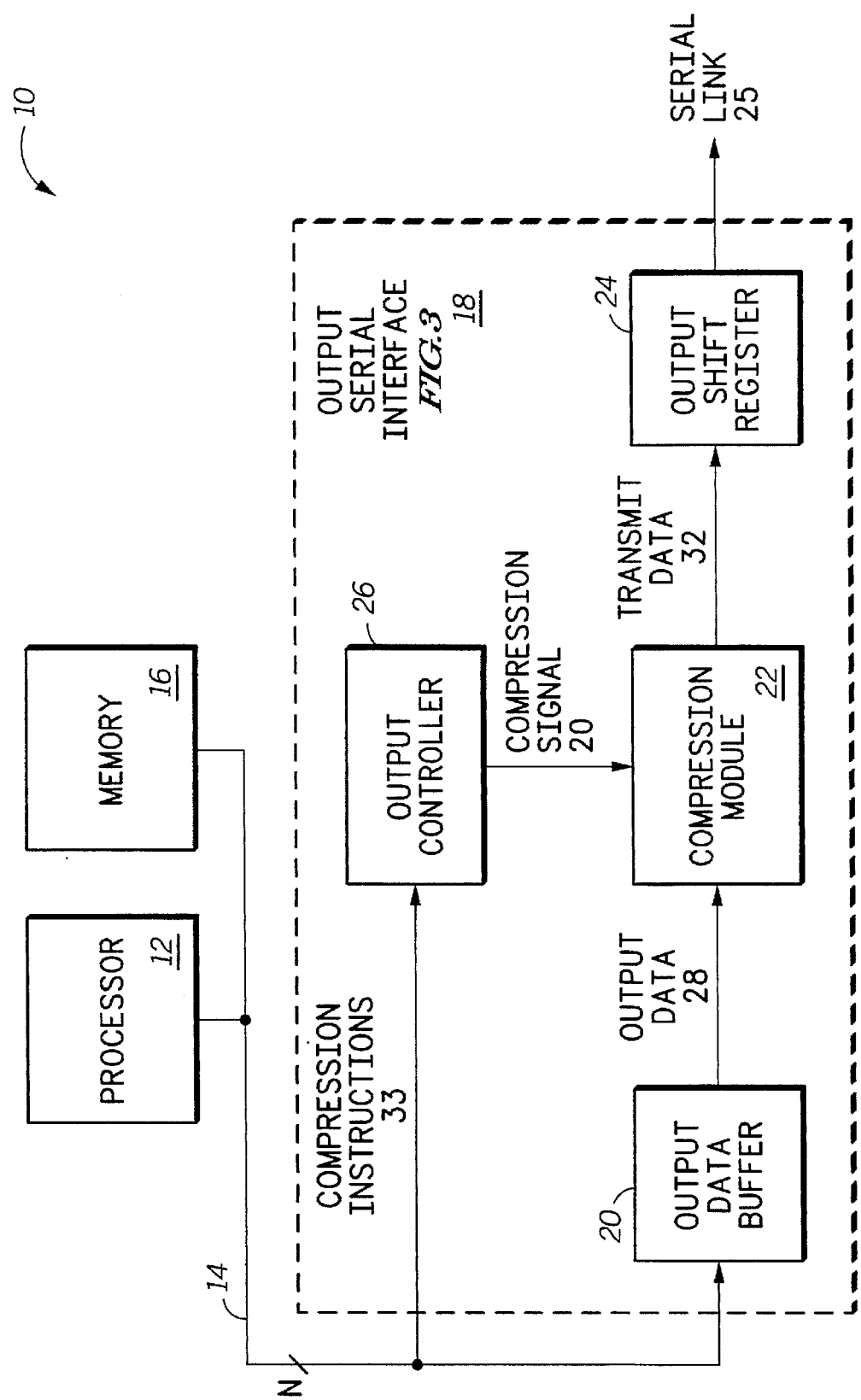
FIG. 1 is a block diagram illustrating a data processing system in accordance with the present invention.

FIG. 1 illustrates a data processing system 10 comprising a processor 12, a processor bus 14 operably coupled to the processor 12, memory 16 operably coupled to the processor bus 14 for storing data, and an output serial interface 18 for selectively compressing data and transmitting data onto a serial link 25.

The processor 12 is of a type known in the art and is capable of processing data based on instructions to produce processed data and reading and writing to bi-directional processor bus 14. The processor bus 14 has a data width of N bits and includes data, address, and control portions to allow the processor 12 to control the operation of the memory 16 and the output serial interface 18. Further, the memory 16 is of a type that is known in the art and is capable of storing data, the data including data that is operated on as well as instructions that are required for the operation of data processing system 10. However, instructions could also be "hardwired" instead of being stored in memory 16.

The output serial interface 18 includes an output data buffer 20, compression module 22, output shift register 24, and controller 26. The output data buffer 20 operably couples to the processor bus 14 and receives output data 28 from the processor bus 14. The output data 28 is organized in blocks with each block corresponding to a slot of data within a frame of data. However, the output data 28 could have a width differing from the width of the data portion of the processor bus 14 since the output data 28 may occupy only a portion of the processor bus 14 or could be transmitted over multiple bus cycles. In some applications, for example, the output data 28 will have a width twice the width of the data bus portion of the processor bus 14. However, the width of data would depend upon the particular application and one skilled in the art will readily appreciate that the data processing system 10 may operate in accordance with specific implementation requirements.

The compression module 22 operably couples to the data buffer 20 and receives the output data 28 from the output data buffer 20. On a slot-by-slot basis, based upon a compression signal 30, the compression module 22 selectively compresses the output data 28 to produce transmit data 32. The transmit data 32 is organized in blocks with each block corresponding to a block of data within a frame of data. Therefore, the transmit data 32 directly correlates to the output data 28 with the transmit data 32 being a selectively compressed representation of the output data 28.

When compression is performed by the compression module 22, the compression module 22 compresses the output data 28 based upon either the A-law or Mu-law compression algorithm. However, based upon the specific implementation, differing compression algorithms may be employed by the compression module 22 to create the transmit data 32 from the output data 28. However, based upon the compression signal 30, the compression module 22 may simply pass the output data 28 without compression as the transmit data 32. In this case, no compression is performed by the compression module 22.

The output shift register 24 operably couples to the compression module 22 and the serial link 25. The output shift register 24 receives the transmit data 32 from the compression module 22 and selectively transmits the transmit data 32 on the serial link 25. As is known in the art, the serial link 25 transmits the transmit data 32 on a bit-by-bit basis based upon the frequency of operation of the serial link 25. Therefore, the output shift register 24 includes circuitry for selectively transmitting the transmit data 32 on a bit-by-bit basis upon the serial link 25. Such a technique is known in the art and will not be further described herein except to expand on the principles of the present invention.

The output controller 26 operably couples to the processor bus 14 and the compression module 22. The output controller 26 receives compression instructions 33 from the processor bus. Based upon the compression instructions 33, the output controller 26 selectively issues the compression signal 30 to the compression module 22 to thereby cause the selective compression of the output data 28.

The data processing system 10 of the present invention selectively compresses output data 28 to create transmit data 32 on a slot-by-slot basis. The selective hardware compression reduces overall processing requirements of the processor 12 by eliminating the software companding requirements. Further, because the selective companding is performed in hardware, data is companded at greater speeds than if performed by software instruction. Unlike prior implementations, the output serial interface 18 may, on a slot-by-slot basis within a frame of data, selectively compress data using a selected compression algorithm or simply pass the data to the serial link 25 without compression.

Thus, the data processing system 10 of the present invention operates with various remote equipment, each having differing companding constraints. The added flexibility and performance of the data processing system 10 not only reduces software processing requirements but effectively increases the data transmission rate of the output serial interface 18 because the processor 12 is not tied up in burdensome companding operations.

Figure 2:
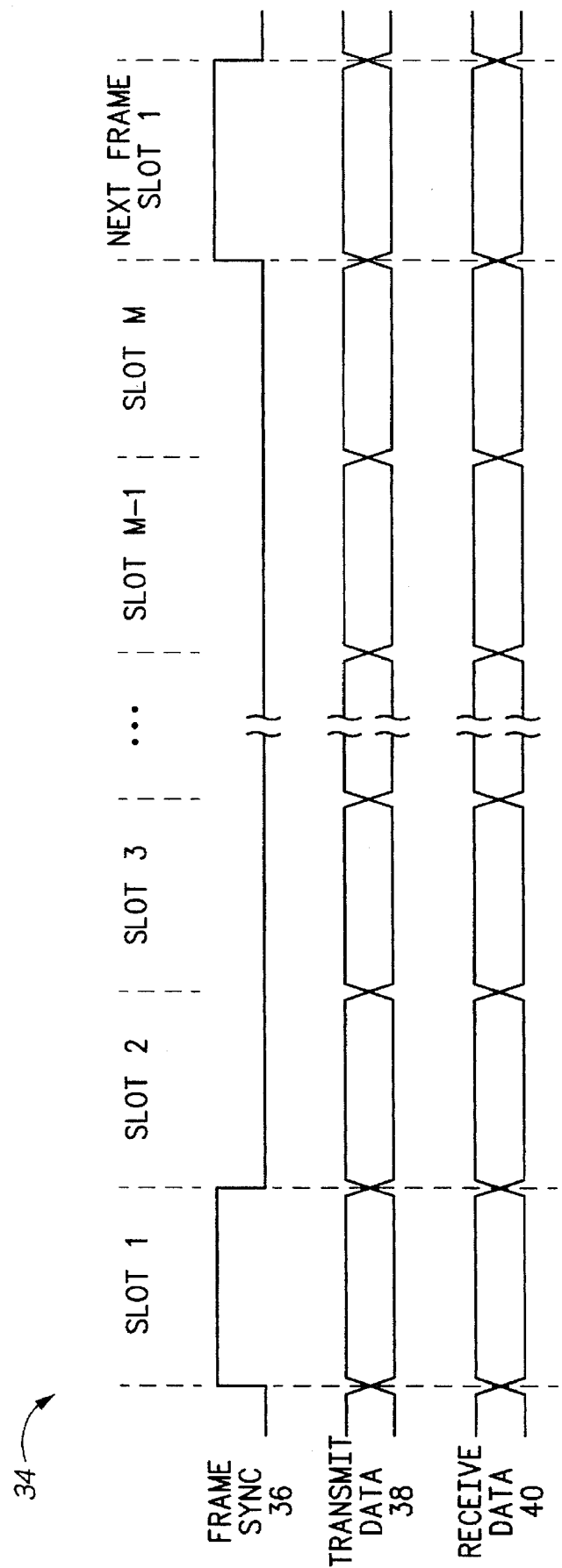
FIG. 2 is a signal transition diagram illustrating the structure of a frame of data in accordance with the present invention.

FIG. 2 illustrates a signal diagram 34 showing the components of a frame of data on a digital serial link 25. As illustrated, a frame synchronization signal 36, transmitted on a separate line, synchronizes with slot one of a frame of data. The frame of data includes multiple slots of data indicated as slot 1 through slot M. Each slot has the same number of bits, with the number of bits in each slot determined by the requirements of the particular application. As is shown, both transmit data 38 and receive data 40 have data in at least one slot within the frame of data. However, based upon system requirements, the transmit data 38 and receive data 40 may use differing slots depending upon the application.

As was previously discussed, higher level signals indicate the organization of data within a data frame. These higher level signals are not further described herein but are known in the art. The higher level signals communicate with the data processing system 10 such that the data processing system 10 determines what data resides in each slot, how wide each slot is, and what companding algorithm is used in conjunction with each slot. The data processing system 10 then operates on the data frame 34 accordingly.

In a time division multiple access digital communication system, slot 1 data may represent a communication between a first location and the second location. Further, slot 2 within the frame of data may represent a communication between the first location and a fourth location. As one skilled in the art will readily appreciate, each slot within the frame of data may represent a separate communication between two locations. In a typical time division multiple access situation, the frame of data will be split into a number of slots with each slot having an identical width. The width may be anywhere from 8 bits up to 128 bits depending upon the particular application. Within each slot, data may be compressed depending upon the transmitting and receiving location equipment in use. As one skilled in the art will readily appreciate, certain types of data transmissions may require compression to place necessary data within one slot. For example, in one particular type of system, 13 or 14 bits of data may be compressed into 8 bits to fit the data within a particular slot of the system.

Thus, the data processing system 10 illustrated in FIG. 1 operates upon the data shown in FIG. 2 so as to selectively compress the data within each slot in the frame of data based upon particular compression requirements. For example, the data processing system 10 may compress slot 1 based upon Mu-law, may simply pass the output data in slot 2 without compression, and may compress data within slot 3 based upon A-law. Thus, the data processing system 10 of FIG. 1 provides the important benefit of selectively compressing data on a slot-by-slot basis.

Figure 3:
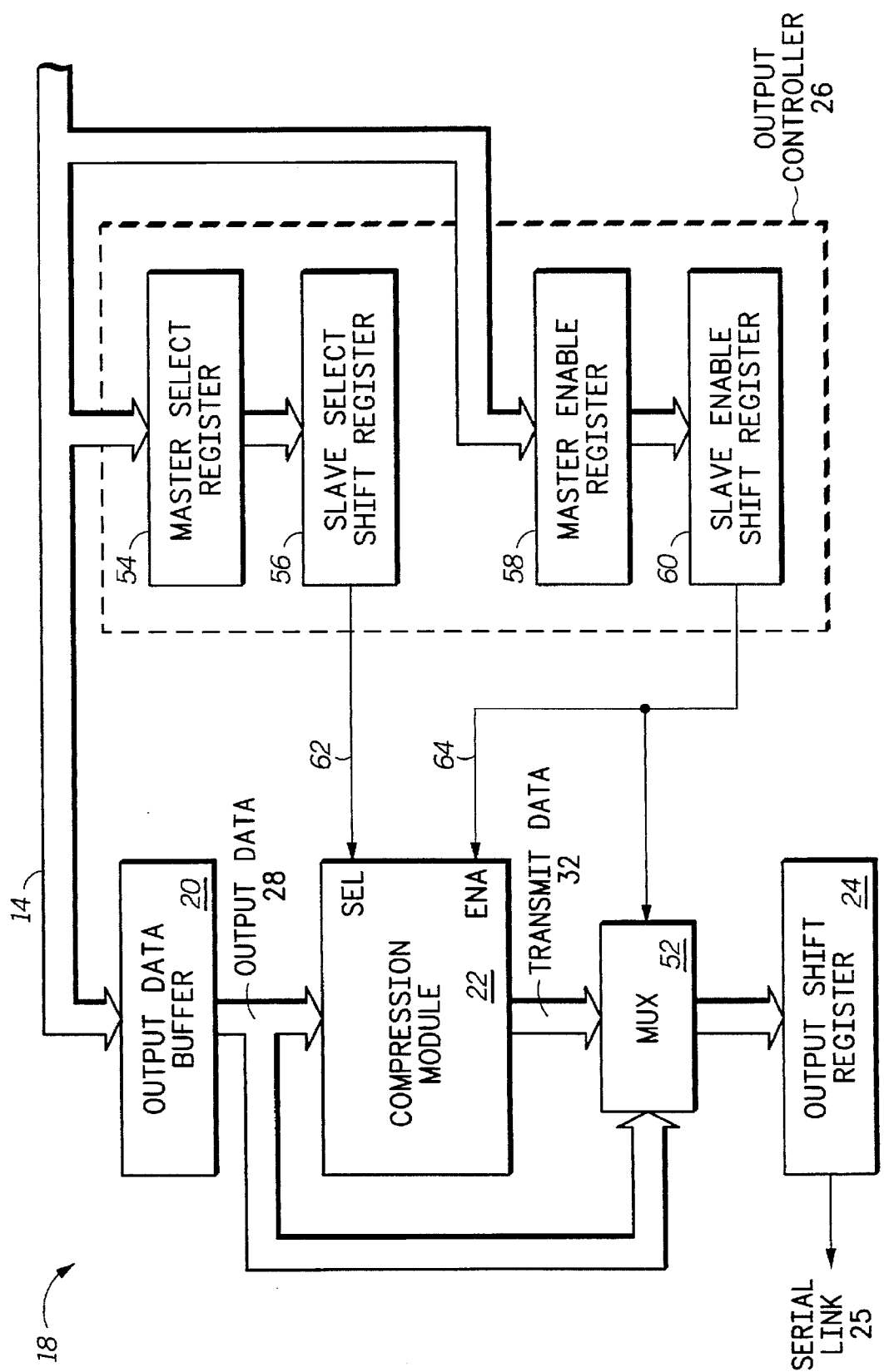
FIG. 3 is a block diagram illustrating the output serial interface of the data processing system of FIG. 1.

FIG. 3 illustrates a particular embodiment of output serial interface 18 of FIG. 1 in accordance with the present invention. The output serial interface 18 includes the output data buffer 20, the compression module 22, output shift register 24, and output controller 26. The output serial interface 18 also includes an output multiplexer 52 for selectively multiplexing the output data 28 around the compression module 22 to the output shift register 24. Further, the output multiplexer 52 includes circuitry for selectively multiplexing at least a portion of the output data 28 and at least a portion of the transmit data 32 to the output shift register 24. In this fashion, a certain number of bits of the output data may be compressed in the compression module 22, and a certain number of bits of the output data 28 may bypass the compression module 22 with the multiplexer 52 joining the two portions of data and transmitting them to the output shift register 24.

The output controller 26 comprises a master select register 54, a slave select shift register 56, a master enable register 58, and a slave enable shift register 60. The master select register 54 receives select instructions of the compression instructions from the processor bus 14 and stores the select instructions. The master enable register 58 receives enable instructions of the compression instructions from the processor bus 14 and stores the instructions. The slave select register 56 receives the select instructions from the master select register 54 and selectively shifts and transmits the select instructions to the compression module 22 as a select signal 62 of the compression signal 30. The slave enable shift register 60 receives the enable instructions from the master enable register 58 and selectively shifts and transmits the select instructions to the compression module 22 as an enable signal 64 of the compression signal 30. Additionally, if other functions in the output serial interface 18 need to be selected on a slot-by-slot basis, control bits for these functions may be combined with the select and enable control bits and encoded in order to minimize the hardware required for the implementation.

Upon the receipt of a frame of data, compression instructions are loaded into the master select register 54 and the master enable register 58 with each portion of the instructions corresponding to a particular frame of data being transmitted by the output serial interface 18. The instructions are then loaded into the slave shift registers 56 and 60. Then, on a slot-by-slot basis, the select signal 62 and enable signal 64 are provided to the compression module 22 and multiplexer 52 to correctly compress and multiplex the slot of data.

Because the slave shift registers 56 and 60 include particular select 62 and enable 64 signals for a complete frame of data, compression instructions need only be loaded to the output serial interface 18 once for a particular frame configuration. However, if the compression format required for a particular frame type changes on successive frames of data, new compression instructions must loaded into the master select register 54 and master enable register 58. If not, the contents of the master registers are simply downloaded again into the slave shift registers 56 and 60 for use during each subsequent frame of data. As one skilled in the art will readily appreciate, such a feature significantly reduces the amount of processing time required to correctly provide the companding instructions to the output serial interface 18.

Thus, the output serial interface 18 illustrated in FIG. 3 provides the important benefits of implementing the slot-by-slot selective compression of output data 28 to produce transmit data 32 with minimal hardware requirements and minimized software interface via the processor 12. Such benefits reduce the overall costs associated with the selective compressing of data and increase the processing capability of the particular system in which a serial interface is installed.

Figure 4:
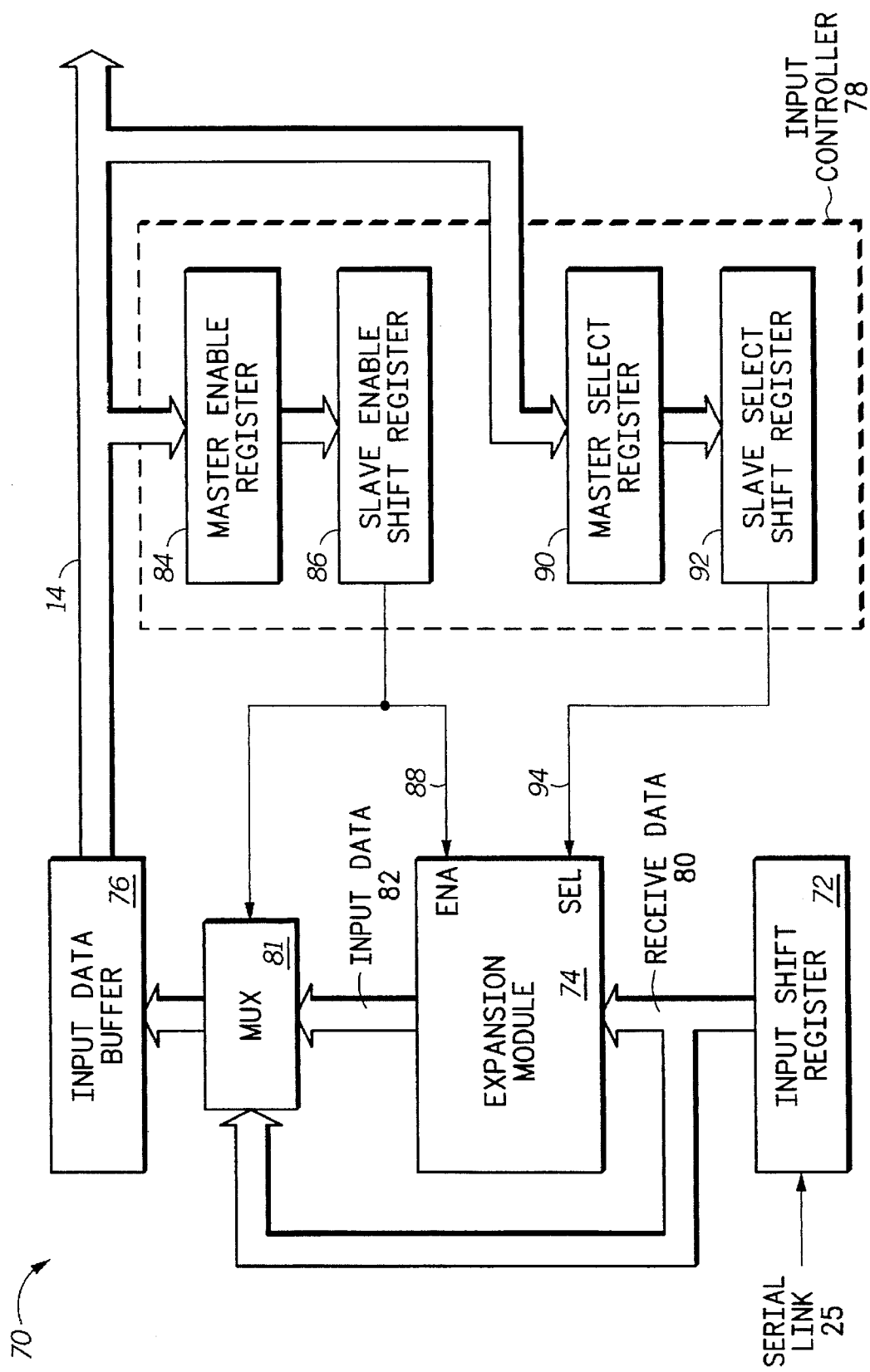
FIG. 4 is a block diagram illustrating an input serial interface in accordance with the present invention.

FIG. 4 illustrates an input serial interface 70 for receiving receive data 80 from the serial link 25 and for selectively expanding the receive data 80 to create input data 82. The input serial interface 70 comprises an input shift register 72, expansion module 74, input data buffer 76, and input controller 78. The input serial interface 70 also includes an input multiplexer 81.

The input shift register 72 operably couples to the serial link 25 and provides the receive data 80 organized as blocks of data. Each block of data of the receive data 80 corresponds to a slot of data within a frame of data. The input shift register 72 is of a type known in the art and adapted for interfacing with the standard serial link 25.

The expansion module 74 operably couples to the input shift register 72 and receives the receive data 80 from the shift register 72. The expansion module 74, based on an expansion enable signal 88 and an expansion select signal 94, selectively expands the receive data 80 to produce the input data 82. Input data 82 is organized in blocks with each block corresponding to a slot of data within the frame of data. Thus, as opposed to the output serial interface 18, the input serial interface 70 selectively expands receive data 80 to produce input data 82 on a slot-by-slot basis, the input data 82 corresponding to the receive data 80 for the particular slot.

The input data buffer 76 operably couples to the expansion module 74 through the multiplexer 81, receives the input data 82 and transmits the input data 82 onto the processor bus 14. The input multiplexer 81 couples to expansion module 74, the input data buffer 76, and the input shift register 72 and also receives expansion enable signal 88 from the input controller 78. Based upon the expansion enable signal 88 from the input controller 78, the input multiplexer 81 selectively multiplexes receive data 80 and input data 82 from the expansion module 74 to the input data buffer 76. The input multiplexer 81 may also selectively multiplex a portion of the receive data 80 with a portion of the input data 82 to the input data buffer 76.

The input controller 78 comprises a master enable register 84, a master select register 90, a slave enable shift register 86, and a slave select shift register 92. The master enable register 84 receives enable instructions of the expansion instructions from the processor bus 14 and stores the instructions. The master select register 90 receives select instructions of the expansion instructions from the processor bus 14 and stores the instructions.

Upon a load from the master registers 84 and 90, the slave select shift register 92 receives the select instructions and the slave enable shift register 86 receives the enable instructions. Then, when receive data 80 is provided to the expansion module 74, the slave shift registers 86 and 92 selectively shift respective select instructions and enable instructions to the expansion module 74 as the select signal 94 and the enable signal 88. The enable signal 88 and the select signal 94 cause the selective operation of the expansion module 74 and the multiplexer 81. Based upon the enable signal 88, the expansion module 74 selectively expands the receive data 80 and the multiplexer 81 selectively multiplexes the receive data 80 with the input data 82 and transmits the data to the input data buffer 76. In this fashion, the receive data 80 received from the serial link 25 is correctly expanded such that the data may be used by the data processing system 10.

While the multiplexer 81 may be viewed as operating in either an on/off mode, it may also be viewed as multiplexing portions of the receive data with portions of the input data 82 during each operation. Such is the case because some bits output by the expansion module 74 are typically "don't care" bits that have no significance and are multiplexed with bits having significance. As will be further discussed hereinafter, the selective multiplexing of data by multiplexer 81 adds to the flexibility of the invention.

Thus, the operation of the input serial interface 70 inversely corresponds to the operation of the previously described output serial interface 18. The expansion module 74 expands the receive data 80 in accordance with the A-law and Mu-law algorithms and others known in the art. In this fashion, the slot-by-slot expansion of data performed in hardware by the input serial interface 70 increases operation speed and reduces software processing requirements. Resultantly, the reduced processing requirements of the associated data processing system allows for a reduced capacity system at a reduced cost performing an equivalent function. Thus, as one skilled in the art will readily appreciate, the implementation of the hardware components of the input serial interface 70 will reduce the overall costs of a device employing the input serial interface 70 as compared to those prior systems known in the art.

Figure 5:
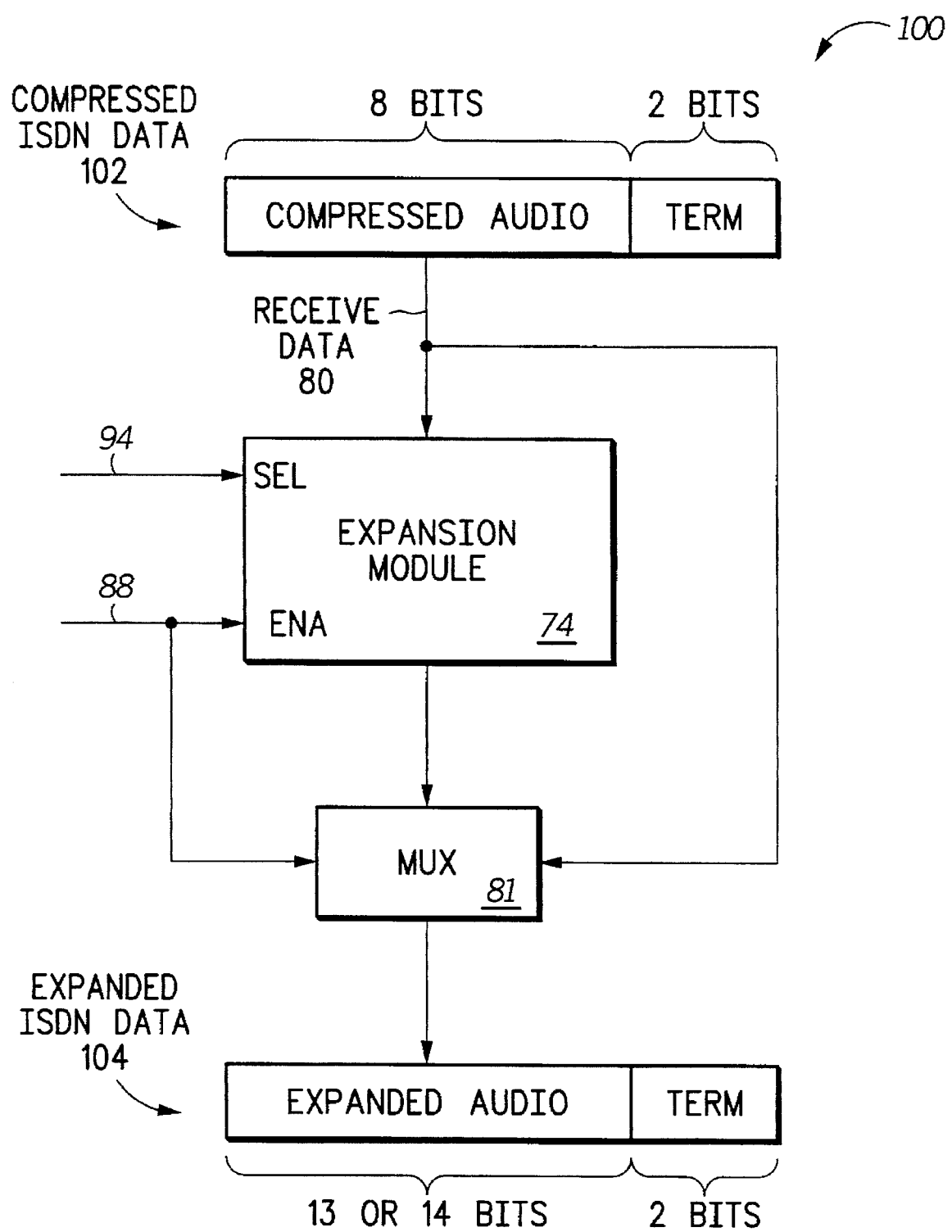
FIG. 5 is a block diagram illustrating a portion of an input serial interface detailing use of the input serial interface with ISDN data.

FIG. 5 illustrates a block diagram of the particular operation and data flow of the input serial interface 70 in conjunction with an interactive services digital network (ISDN). In the particular system 100, compressed ISDN data 102 includes 8 bits of compressed audio data and 2 bits of terminal data. In accordance with the principles of the present invention, the compressed audio data is provided to the expansion module 74 and, based upon the enable signal 88 and the select signal 94, the compressed audio data is expanded to produce expanded audio data having a 13 or 14 bit width. However, the terminal data comprising 2 bits bypasses the expansion module 74 and the input multiplexer 81 selectively multiplexes the terminal data with the expanded audio data. The overall width of the ISDN data, including the terminal data, is 15 or 16 bits wide depending upon the algorithm used for expansion. Resultantly the expanded ISDN data 104 retains its terminal information and its audio data, but in a correctly expanded format. An inverse operation may also be performed by the present invention so as to provide the ability to selectively compress data that is segregated into two types of data within a single slot. Thus, the teachings of the present invention include the partial companding of data.

Figure 6:
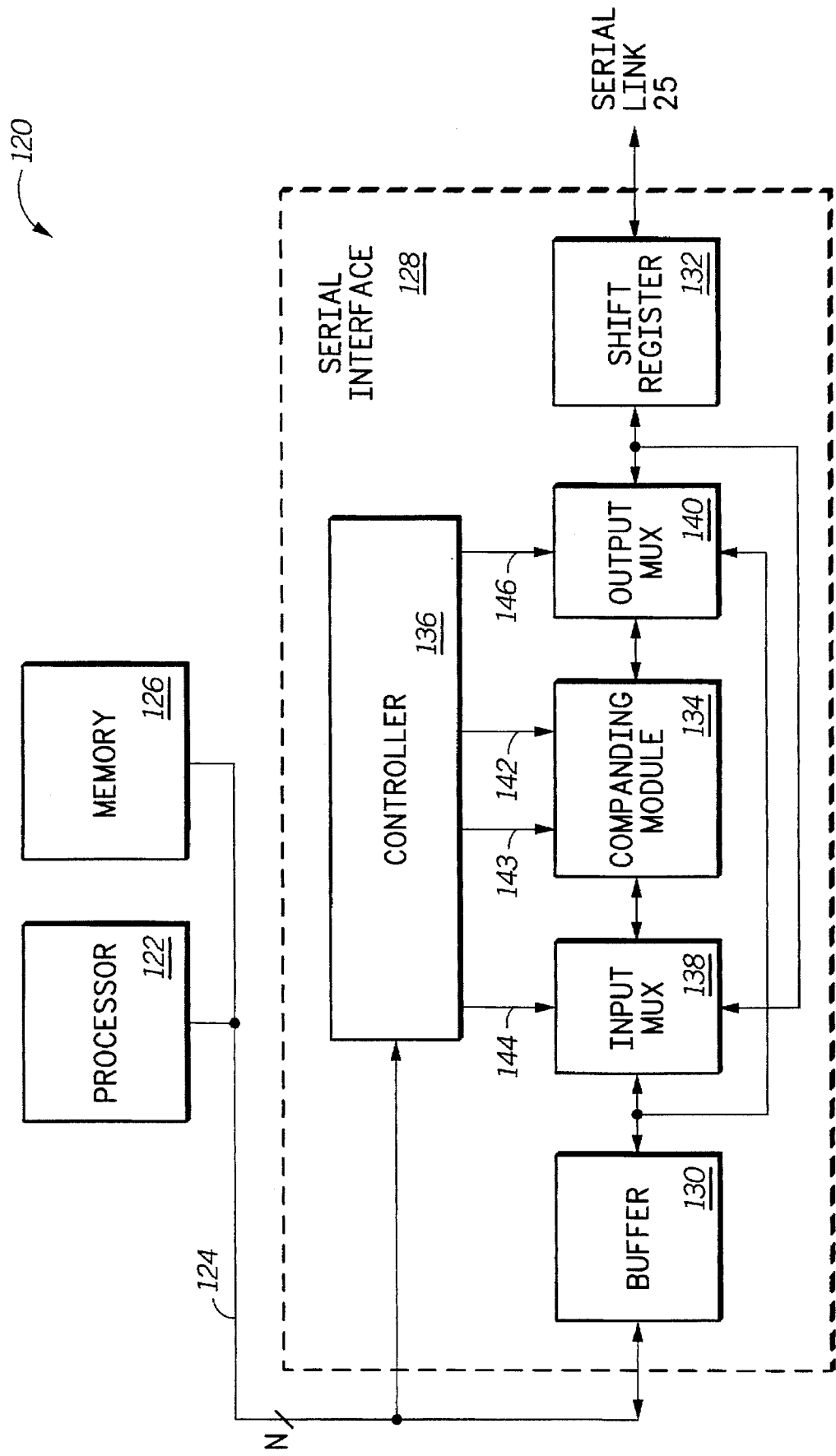
FIG. 6 is a block diagram illustrating a data processing system having a companding serial interface in accordance with the present invention.

FIG. 6 is a block diagram illustrating an alternative data processing system 120 in accordance with the present invention. The data processing system 120 comprises a processor 122, a processor bus 124, memory 126, and a serial interface 128. One difference between the data processing system 120 of FIG. 6 and the previously described data processing systems of FIGS. 1 through 4 is that the data processing system 120 of FIG. 6 includes a single bi-directional serial interface 128 while the other implementations include single direction serial interfaces.

The processor 122, memory 126, and the processor bus 124 are of a type known in the art. These particular components operate substantially similar to those described in accordance with FIG. 1 and will not be further described herein.

The serial interface 128 comprises a data buffer 130, a shift register 132, a companding module 134, and a controller 136. The data processing system 120 also comprises an input multiplexer 138 and an output multiplexer 140. The data buffer 130 couples to the processor bus 124 and receives output data from the processor bus 124. The output data is organized in blocks with each block corresponding to a slot of data within a frame of data. The data buffer 130 also transmits input data to the processor bus with the input data organized in blocks with each block corresponding to a slot of data within a frame of data. In accordance with the data processing system 120 of FIG. 6, data is passed bi-directionally through the data buffer 130 between the processor bus 124, the input multiplexer 138, and the output multiplexer 140.

The shift register 132 operably couples to the serial link 25, the output multiplexer 140, and the input multiplexer 138. The shift register 132 is also bi-directional and both receives receive data from the serial link 25 and transmits transmit data on to the serial link 25. The shift register 132 receives transmit data from the output multiplexer 140 and selectively couples the transmit data to the serial link 25. The transmit data is organized in blocks with each block corresponding to a slot of data within a frame of data. The shift register 132 also receives receive data from the serial link 25 with the receive data organized in blocks with each block corresponding to a slot of data within a frame of data.

The companding module 134 operably couples to the input multiplexer 138, the output multiplexer 140, the data buffer 130 through the input multiplexer 138, the shift register 132 through the output multiplexer 140, and the controller 136. The companding module 134 receives output data and, on a slot-by-slot basis based upon a compression signal 142, selectively compresses the output data to produce the transmit data. Further, the companding module 134 receives received data from the shift register 132 through the multiplexer 140 and, on a slot-by-slot basis based upon an expansion signal 143, selectively expands the receive data to produce the input data. Thus, the companding module 134 operates bi-directionally to selectively compress and expand data based upon the compression signal 142 and the expansion signal 143. As one skilled in the art will readily appreciate, the companding module 134 could be implemented in various manners depending upon the particular requirements of the given system.

The controller 136 operably couples to the processor bus 124, the companding module 134, the input multiplexer 138, and the output multiplexer 140. The controller 136 receives companding instructions from the processor bus 124 and selectively issues the compression signal 142 to the companding module 134, the expansion signal 143 to the companding module 134, control signal 144 to the input multiplexer 138, and a control signal 146 to the output multiplexer 140.

The input multiplexer 138, based upon the control signal 144 received from the controller 136, selectively multiplexes signals from the companding module 134 and from the shift register 132 to the data buffer 130. As shown in FIG. 5 and previously described, the input multiplexer may multiplex all or a portion of the respective signals depending upon the requirements of the particular system.

The output multiplexer 140 selectively multiplexes signals from the companding module 134 and the data buffer 130 to the shift register 132 based upon control signal 146. Further, as was previously described, the output multiplexer 140 may selectively multiplex all or a portion of the particular signals applied.

Thus, the data processing system 120 illustrated in FIG. 6 provides the same advantages of the data processing system described in FIGS. 1 through 5. These benefits provide an overall increase in performance with a minimal increase in hardware in the particular application. Resultantly, the data processing system 120 has reduced software requirements and increased functionality to reduce overall costs and increase performance.

Figure 7:
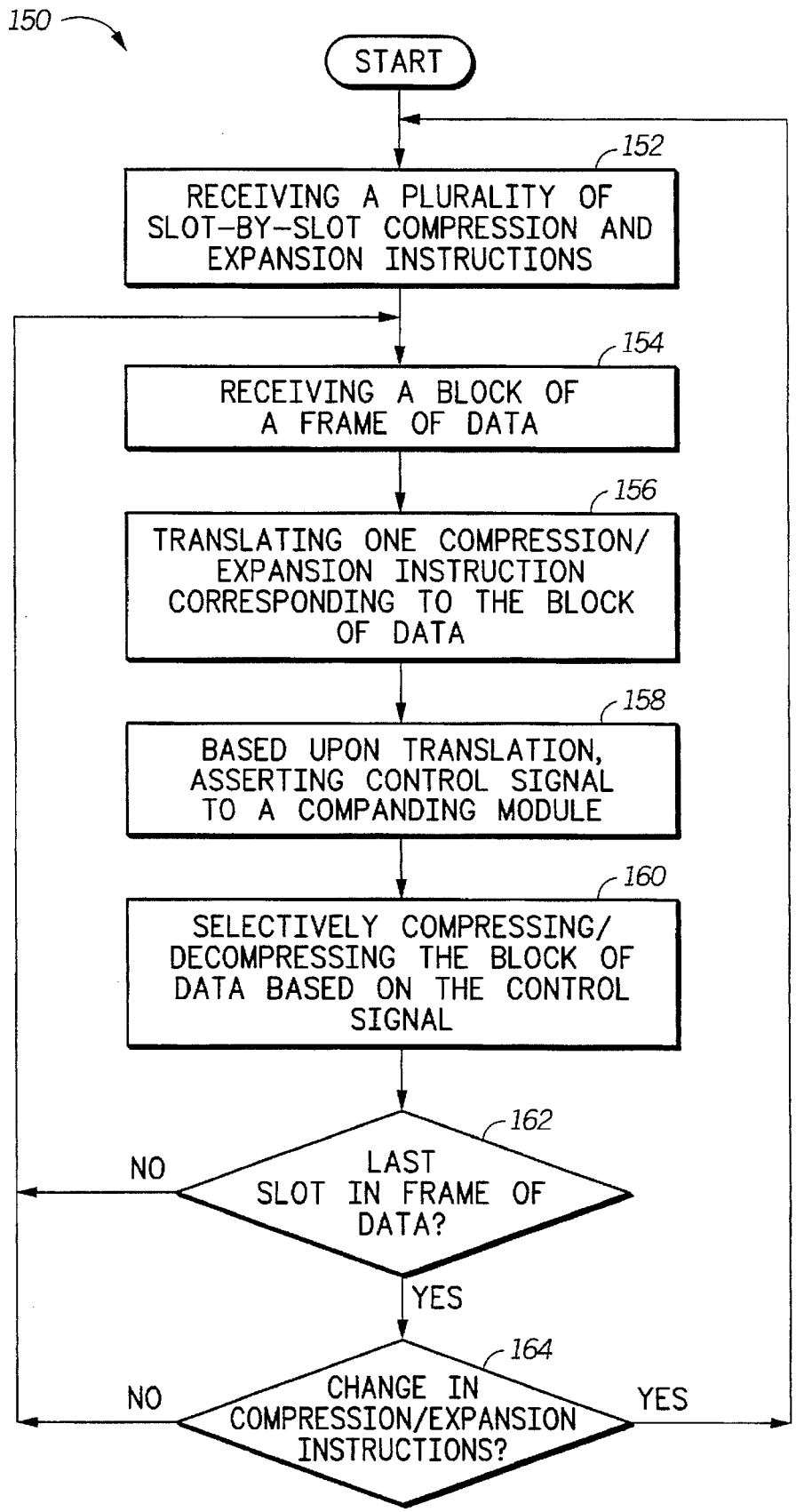
FIG. 7 is a flow chart illustrating a method for selectively compressing and expanding data on a slot-by-slot basis in accordance with the present invention.

FIG. 7 is a flow chart illustrating a method 150 for selectively compressing and expanding data on a slot-by-slot basis within a time division multiple access network. The method 150 includes as a first step 152 receiving a plurality of slot-by-slot compression and expansion instructions. These slot-by-slot compression and expansion instructions relate information on a frame of data to be either compressed or expanded in accordance with the method 150. In accordance with step 152, the compression and expansion instructions relate information describing how each particular slot of data within a data frame will be compressed or expanded.

Next, at step 154, the method includes receiving a block of data. The block of data corresponding to a slot of data of a frame of data. At step 156, the method includes translating one of the plurality of slot-by-slot compression and expansion instructions corresponding to the block of data. From step 154 the method proceeds to step 156 wherein the instruction of asserting a control signal to a companding module based upon a translation of the compression and expansion instructions is accomplished. In accordance with step 156, for the particular block of data under consideration, the particular compression/expansion instruction is translated.

Next, at step 158, a control signal is asserted to a companding module based upon the translation. The control signal will cause the companding module to either compress or expand the block of data in accordance with the translation. Next, at step 160, the step of selectively compressing and decompressing a block of data within a companding module based upon the control signal is performed. Upon performing step 160, data is selectively transformed so that it may be further processed. If the data has been compressed in method 160, then the data will be transmitted on the serial link. However, if the data has been expanded in method step 160, the data will be further operated upon at a receiving location.

From step 160, the method proceeds to decision step 162 wherein it is determined whether the last slot in the frame of data has been operated upon. If, at decision step 162, the last slot has not been operated on, the method proceeds to decision step 154 where another block is received. However, if the last slot in the frame of data has been operated upon, the method proceeds to step 164 where it is determined whether or not there has been a change in the compression/expansion instructions. If there has been no change in the compression/expansion instructions, the method proceeds to step 154 wherein a new block of data of a frame of data is received and the same compression/instructions are used in the selective compressing and expanding of data. However, if at step 154 it is determined that there is a change in the compression/expansion instructions the method proceeds to step 152 wherein new compression/expansion instructions are received.

Figure 8:
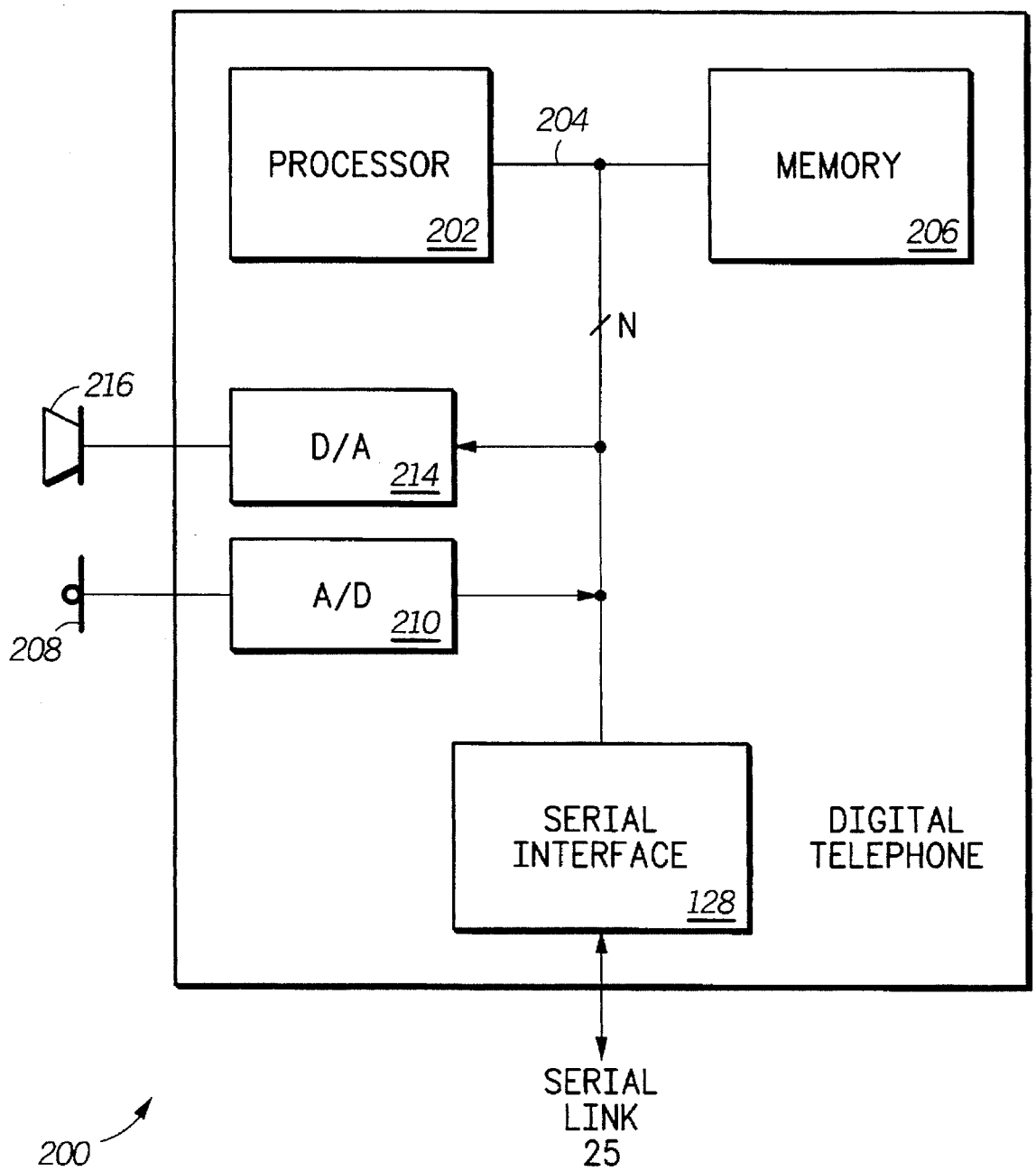
FIG. 8 is a block diagram illustrating a digital telephone in accordance with the present invention.

FIG. 8 illustrates a digital telephone 200 in accordance with the present invention. The digital telephone comprises a processor 202, processor bus 204, memory 206, a microphone 208, an analog to digital (A/D) converter 210, a serial interface 128, a digital to analog (D/A) converter 214, and a speaker 216. The processor 202, processor bus 204, memory 206, and serial interface 128 work in accordance with the principles and teachings previously discussed in accordance with FIGS. 1 through 7. Therefore, these elements will not be further described herein with respect to FIG. 8.

The microphone 208 receives analog audio signals from a user, the A/D converter 210 converts the analog audio signals to digitized audio signals, and the processor operates 202 upon the signals. The digitized audio signals will typically be partially fed back to the speaker 216, processed by the processor 202, and primarily transmitted through the serial interface 212 and across the serial link 25 to a remote location. Incoming digitized audio signal signals arrive via the serial link 25, are processed through the serial interface 212, processed by the processor 202, converted to analog signals via the D/A converter 214, and output to the user through the speaker 216.

The selective companding performed in accordance with the digital telephone 200 of the present invention allows for reduced processing requirements of the processor 202, increased frequency of operation, and an overall cost reduction. Thus, reduced power consumption of the digital telephone 200 may also be realized through use of the teachings of the present invention.

Thus, the method of the present invention provides the important advantages of selectively compressing and expanding a block of data of a frame of data on a slot-by-slot basis. Such selective compression and expansion was not capable in the prior art devices without significant software impact.

The above described preferred embodiments are intended to illustrate the principles of the invention, but not to limit the scope of the invention. Various other embodiments and modifications to these preferred embodiments may be made by those skilled in the art without departing from the scope of the following claims.

What is claimed is:

1. A data processing system, comprising:
   an output serial interface for selectively compressing data and for transmitting the compressed data onto a serial link, wherein the output serial interface comprises:
      an output data buffer for receiving the data, the data organized in blocks with each block corresponding to a slot of data within a frame of data;
      a compression module operably coupled to the output data buffer for receiving the data from the output data buffer and, on a slot-by-slot basis, based upon a compression signal, selectively compressing the data to produce transmit data, the transmit data organized in blocks with each block corresponding to the slot of data within the frame of data;
      an output shift register operably coupled to the compression module and the serial link for receiving the transmit data from the compression module and selectively transmitting the transmit data on the serial link; and an output controller operably coupled to the compression module for receiving the compression signal and selectively issuing the compression signal to the compression module to thereby cause the selective compression of the data from the output data buffer.

2. The data processing system of claim 1, wherein the output serial interface further comprises an output multiplexer operably coupled to the output data buffer, the compression module, the output shift register, and the output controller, wherein the output multiplexer, based upon an output control signal received from the output controller, selectively multiplexes transmit data from the compression module and the data from the output data buffer to the output shift register.

3. The data processing system of claim 2, wherein the output multiplexer includes additional circuitry for selectively multiplexing at least a portion of the transmit data and at least a portion of the data from the output data buffer to the output shift register.

4. The data processing system of claim 3, wherein the data from the output data buffer comprises a plurality of bits of ISDN data, the plurality of bits of ISDN data including bits representing digitized audio data and bits representing terminal data, wherein the compression module selectively compresses the digitized audio data to produce compressed audio data, and wherein the output multiplexer selectively multiplexes the compressed audio data and the terminal data to the output shift register.

5. The data processing system of claim 1, wherein the output controller comprises:

a master register for receiving the compression signal; and a slave shift register operably coupled to the master register and the compression module for receiving the compression signal from the master register and selectively shifting and transmitting the compression signal to the compression module.

6. The data processing system of claim 5, wherein:

the master register comprises a master select register and a master enable register, the master select register for receiving select instructions and the master enable register for receiving enable instructions; and the slave shift register comprises a slave select register and a slave enable register, the slave select register for receiving the select instructions from the master select register and selectively shifting and transmitting the select instructions to the compression module, and the slave enable register for receiving the enable instructions from the master enable register and selectively shifting and transmitting the enable instructions to the compression module.

7. The data processing system of claim 1, wherein the frame of data includes at least two slots of data.

8. The data processing system of claim 1 further comprising:

an input serial interface for receiving receive data from the serial link and for selectively expanding the receive data, wherein the input serial interface comprises:

an input shift register operably coupled to the serial link for receiving the receive data from the serial link, the receive data organized in blocks with each block corresponding to the slot of data within the frame of data;

an expansion module operably coupled to the shift register for receiving the receive data and selectively expanding the receive data on a slot-by-slot basis based upon an expansion signal to produce input data, the input data organized in blocks with each block corresponding to the slot of data within the frame of data;

an input data buffer operably coupled to the expansion module and processor bus for receiving the input data from the expansion module and transmitting the input data on the processor bus; and an input controller operably coupled to the expansion module for receiving expansion instructions and selectively issuing the expansion signal to the expansion module to cause the selective expansion of the receive data.

9. The data processing system of claim 8, wherein the input serial interface further comprises:

an input multiplexer operably coupled to the input data buffer, the expansion module, the input shift register, and the input controller, wherein the input multiplexer, based upon an input control signal from the input controller, selectively multiplexes receive data from the input shift register and input data from the expansion module to the input data buffer.

10. The data processing system of claim 8, wherein the expansion module expands data in accordance with a companding algorithm selected from the group consisting of A-Law and Mu-Law.

11. The data processing system of claim 8, wherein the input controller comprises:

master register operably coupled to a processor bus for receiving the expansion instructions from the processor bus; and slave shift register operably coupled to the master register and the expansion module for receiving the expansion instructions from the master register and selectively shifting and transmitting the expansion instructions to the expansion module as the expansion signals.

12. The data processing system of claim 11, wherein:

the master register comprises a master select register and a master enable register, the master select register receiving select instructions of the expansion instructions and the master enable register receiving enable instructions of the expansion instructions; and the slave shift register comprises a slave select register and a slave enable register, the slave select register receiving the select instructions from the master select register and selectively shifting and transmitting the select instructions to the expansion module, and the slave enable register for receiving the enable instructions from the master enable register and selectively shifting and transmitting the enable instructions to the expansion module.

13. A data processing system comprising:

a processor;

a processor bus operably coupled to the processor;

a serial interface for selectively compressing and decompressing data and for transmitting and receiving data on a serial link, wherein the serial interface comprises:

a data buffer operably coupled to the processor bus for receiving output data from the processor bus, the output data organized in blocks with each block corresponding to a slot of data within a frame of data, the output data buffer also for transmitting input data to the processor bus, the input data organized in blocks with each block corresponding to the slot of data within the frame of data;

a shift register operably coupled to the serial link for receiving transmit data and coupling the transmit data to the serial link, the transmit data organized in blocks with each block corresponding to the slot of data within the frame of data, the shift register also for receiving receive data from the serial link, the receive data organized in blocks with each block corresponding to the slot of data within the frame of data;

a companding module operably coupled to the data buffer and the shift register for receiving the output data from the data buffer and, on a slot-by-slot basis, based upon a compression signal, selectively compressing the output data to produce the transmit data, the companding module also for receiving the receive data from the shift register and, on a slot-by-slot basis, based upon an expansion signal, selectively expanding the receive data to produce the input data; and a controller operably coupled to the processor bus and the companding module for receiving companding instructions from the processor bus and for selectively issuing the compression signal and the expansion signal to the companding module.

14. The data processing system of claim 13, wherein the serial interface further comprises an input multiplexer operably coupled to the data buffer, the companding module, the shift register, and the controller, the input multiplexer, based upon an input control signal received from the controller, selectively multiplexes receive data from the shift register and input data from the expansion module to the data buffer.

15. The data processing system of claim 14, wherein the input multiplexer includes additional circuitry for selectively multiplexing at least a portion of the receive data with at least a portion of the input data to the data buffer.

16. The data processing system of claim 15, wherein the input data comprises a plurality of bits of ISDN data, the plurality of bits of ISDN data including bits representing compressed digitized audio data and bits representing terminal data, wherein the companding module selectively expands the compressed digitized audio data to produce digitized audio data, and wherein the input multiplexer selectively multiplexes the digitized audio data and the terminal data to the data buffer.

17. The data processing system of claim 13, wherein the serial interface further comprises an output multiplexer operably coupled to the data buffer, the companding module, the shift register, and the controller, wherein the output multiplexer, based upon an output control signal received from the controller, selectively multiplexes transmit data from the companding module and output data from the data buffer to the shift register.

18. The data processing system of claim 17, wherein the output multiplexer includes additional circuitry for selectively multiplexing at least a portion of the transmit data and at least a portion of the output data to the shift register.

19. The data processing system of claim 18, wherein the output data comprises a plurality of bits of ISDN data, the plurality of bits of ISDN data including bits representing digitized audio data and bits representing terminal data, wherein the companding module selectively compresses the digitized audio data to produce compressed audio data, and wherein the output multiplexer selectively multiplexes the compressed audio data and the terminal data to the shift register.

20. The data processing system of claim 13, wherein the controller comprises:

a master register operably coupled to the processor bus for receiving the companding instructions from the processor bus; and a slave shift register operably coupled to the master register and the compression module for receiving the companding instructions from the master register and selectively shifting and transmitting the companding instructions to the companding module as the compression signal and the expansion signal.

21. The data processing system of claim 20, wherein:

the master register comprises a master select register and a master enable register, the master select register for receiving select instructions of the companding instructions, and the master enable register for receiving enable instructions of the companding instructions; and the slave shift register comprises a slave select register and a slave enable register, the slave select register for receiving the select instructions from the master select register and selectively shifting and transmitting the select instructions to the companding module, wherein the slave enable register receives the enable instructions from the master enable register and selectively shifts and transmits the enable instructions to the companding module.

22. In a time division multiple access network, a method for selectively compressing data on a slot-by-slot basis, the method comprising the steps of:

receiving a plurality of slot-by-slot compression instructions;

receiving a block of data, the block of data corresponding to a slot of data of a frame of data;

translating one of the plurality of slot-by-slot compression instructions corresponding to the block of data;

based upon a translation of the compression instructions, asserting a control signal to a compression module; and selectively compressing the block of data with the compression module based upon the control signal.

23. The method of claim 22, wherein the step of selectively compressing the block of data with the compression module based upon the control signal comprises the steps of:

compressing a portion of the block of data of the frame of data to produce a compressed portion of a block of data; and combining the compressed portion of the block of data with an uncompressed portion of the block of data to form a transmit block of data.

24. The method of claim 22, wherein in step the step of selectively compressing the block of data with the compression module based upon the control signal is performed in accordance with a compression algorithm selected from the group consisting of A-Law and Mu-Law.

25. The method of claim 22, wherein a frame of data includes at least two slots of data.

26. In a time division multiple access network, a method for selectively expanding data on a slot-by-slot basis, the method comprising the steps of:

receiving a plurality of slot-by-slot expansion instructions;

receiving a block of data, the block of data corresponding to a slot of data of a frame of data;

translating one of the plurality of slot-by-slot expansion instructions corresponding to the block of data;

based upon a translation of the expansion instructions, asserting a control signal to an expansion module; and selectively expanding the block of data with the expansion module based upon the control signal.

27. The method of claim 26, wherein the step of selectively expanding the block of data with the expansion module based upon the control signal comprises the steps of:

expanding a portion of the block of data of the frame of data to produce an expanded portion of a block of data; and combining the expanded portion of the block of data with an unexpanded portion of the block of data to form a receive block of data.

28. The method of claim 26, wherein in step the step of selectively expanding the block of data with the expansion module based upon the control signal is performed in accordance with an expansion algorithm selected from the group consisting of A-Law and Mu-Law.

29. The method of claim 26, wherein a frame of data includes at least two slots of data.

30. A digital telephone comprising:

a processor;

a processor bus operably coupled to the processor;

a microphone for receiving acoustic audio data and producing analog audio data;

an A/D converter operably coupled to the microphone and the processor bus for receiving the analog audio data and converting the analog audio data to output data in a digital format;

a serial interface for selectively compressing and decompressing data and for transmitting and receiving data on a serial link, wherein the serial interface comprises:

a data buffer operably coupled to the processor bus for receiving the output data from the processor bus, a block of output data corresponding to a slot of data within a frame of data, the data buffer also for transmitting input data to the processor bus, a block of input data corresponding to a slot of data within a frame of data;

a shift register operably coupled to the serial link, wherein the shift register receives transmit data and selectively couples the transmit data to the serial link, the transmit data organized in blocks with each block corresponding to a slot of data within a frame of data, the shift register also for receiving receive data from the serial link, the receive data organized in blocks with each block corresponding to a slot of data within a frame of data;

a companding module operably coupled to the data buffer and the shift register, wherein the companding module receives the output data from the data buffer and, on a slot-by-slot basis, based upon a compression control signal, selectively compresses the output data to produce the transmit data and provide the transmit data to the shift register, and wherein the companding module receives the receive data from the shift register and, on a slot-by-slot basis, based upon an expansion control signal, selectively expands the receive data to produce the input data; and a controller operably coupled to the processor bus and the companding module, wherein the controller receives companding instructions from the processor bus, and wherein the controller selectively issues the compression signal and the expansion signal;

a D/A converter operably coupled to the processor bus for receiving the input data and converting the input data to analog audio data; and a speaker operably coupled to the D/A converter for receiving the analog audio data and producing acoustic audio data.

31. An interactive services digital network (ISDN) interface comprising:

a processor;

a processor bus operably coupled to the processor;

a memory operably coupled to the processor bus for storing data;

a serial interface for selectively compressing and decompressing data and for transmitting and receiving data on a serial link, wherein the serial interface comprises:

a data buffer operably coupled to the processor bus for receiving output data from the processor bus, the output data organized in blocks with each block corresponding to a slot of ISDN data within a frame of data, the data buffer also for transmitting input data to the processor bus, the input data organized in blocks with each block corresponding to a slot ISDN data within a frame of data;

a shift register operably coupled to the serial link for receiving transmit data and coupling the transmit data to the serial link, the transmit data organized in blocks with each block corresponding to a slot of ISDN data within a frame of data, the shift register also for receiving receive data from the serial link, the receive data organized in blocks with each block corresponding to a slot of ISDN data within a frame of data;

a companding module operably coupled to the data buffer and the shift register, for receiving a portion of the output data from the data buffer and, on a slot-by-slot basis, based upon a compression control signal, selectively compressing the portion of the output data to produce a portion of the transmit data, the companding module also for receiving a portion of receive data from the shift register and, on a slot-by-slot basis, based upon an expansion control signal, selectively expanding the portion of the receive data to produce a portion of the input data; and a controller operably coupled to the processor bus and the companding module, wherein the controller receives companding instructions from the processor bus, and wherein the controller selectively issues the compression signal and the expansion signal to the companding module; and a multiplexer operably coupled to the data buffer, shift register, companding module, and controller, wherein, based upon an input control signal, the multiplexer selectively multiplexes the portion of the input data from the companding module and a portion of the receive data from the shift register to the data buffer as the input data, and wherein, based upon an output control signal, the multiplexer selectively multiplexes the portion of the transmit data from the companding module and a portion of the output data to the shift register as the transmit data.

* * * * *